(12) United States Patent
Godfredsen et al.

(10) Patent No.: US 6,820,077 B2
(45) Date of Patent: Nov. 16, 2004

(54) METHOD AND SYSTEM FOR NAVIGATING A LARGE AMOUNT OF DATA

(75) Inventors: Niels Godfredsen, San Francisco, CA (US); Spencer Lord, San Francisco, CA (US); Yusuf Bashir, San Francisco, CA (US); Eric Ying, Emeryville, CA (US); Oliver Tse, Sunnyvale, CA (US)

(73) Assignee: Informatica Corporation, Redwood City, CA (US)

( * ) Notice: Subject to any disclaimer, the term of this patent is extended or adjusted under 35 U.S.C. 154(b) by 239 days.

(21) Appl. No.: 10/082,486

(22) Filed: Feb. 22, 2002

(65) Prior Publication Data

US 2003/0163441 A1 Aug. 28, 2003

(51) Int. Cl.⁷ .............................................. G06F 17/30
(52) U.S. Cl. ........................... 707/3; 345/763; 345/764
(58) Field of Search ..................... 707/1, 2, 3; 345/700, 345/713, 762, 763, 764

(56) References Cited

U.S. PATENT DOCUMENTS

| | | | | |
|---|---|---|---|---|
| 5,933,796 A | * | 8/1999 | Ashida et al. .............. | 702/181 |
| 6,369,840 B1 | * | 4/2002 | Barnett et al. .............. | 345/853 |
| 6,535,872 B1 | * | 3/2003 | Castelli et al. ................. | 707/3 |
| 6,616,701 B2 | * | 9/2003 | Doyle ..................... | 715/501.1 |
| 6,671,689 B2 | * | 12/2003 | Papierniak .................. | 707/100 |

* cited by examiner

Primary Examiner—Jack Choules

(57) ABSTRACT

Methods for navigating a large amount of data are disclosed. In one embodiment, the present invention accesses a source of formatted warehoused data. The present invention then displays a grid on a display device. In one embodiment, the grid is an iconic representation of the formatted warehoused data. The grid is comprised of elements, each element corresponding to some portion of the formatted warehoused data. The present invention displays a portion of the formatted warehoused data on the display device in response to a selection of a corresponding element of the grid. In another embodiment, the formatted warehoused data is condensed so that it can be read in summary form to a user using a voice-based protocol. The user can issue voice commands to drill down deeper into the data, until the desired information is reached. The user thus doesn't need to hear all of the information in the formatted warehoused data, but instead can make inquiries to directly navigate to a particular item of interest.

30 Claims, 7 Drawing Sheets

500

| Size | S | | M | | L | | Total | |
|---|---|---|---|---|---|---|---|---|
| Product | Quantity | Cost | Quantity | Cost | Quantity | Cost | Quantity | Cost |
| A | 1NA | 1XA | 2NA | 2XA | 3NA | 3XA | NA | XA |
| B | 1NB | 1XB | 2NB | 2XB | 3NB | 3XB | NB | XB |
| C | 1NC | 1XC | 2NC | 2XC | 3NC | 3XC | NC | XC |
| Total | NS | XS | NM | XM | NL | XL | NA+NB+NC | XA+XB+XC |

| Product | Quantity | Cost |
|---|---|---|
| A | NA | XA |
| B | NB | XB |
| C | NC | XC |
| Total | NA+NB+NC | XA+XB+XC |

| Products | Quantity | Cost |
|---|---|---|
| Total | NA+NB+NC=N | XA+XB+XC=X |

FIG. 5C

METHOD AND SYSTEM FOR NAVIGATING A LARGE AMOUNT OF DATA

FIELD OF THE INVENTION

The present invention relates to database management systems. Specifically, the present invention pertains to a method and system for navigating a large amount of data.

BACKGROUND ART

Computers are used to perform a wide variety of applications in such diverse fields as finance, traditional and electronic commercial transactions, manufacturing, health care, telecommunications, etc. Most of these applications typically involve inputting or electronically receiving data, processing the data according to a computer program, then storing the results in a database, and perhaps transmitting the data to another application, messaging system, or client in a computer network. As computers become more powerful, faster, and more versatile, the amount of data that can be processed also increases.

Unfortunately, the raw data found in operational databases often exist as rows and columns of numbers and codes which, when viewed by individuals, appears bewildering and incomprehensible. Furthermore, the scope and vastness of the raw data stored in modern databases is overwhelming to a casual observer. Hence, applications were developed in an effort to help interpret, analyze, and compile the data so that it may be readily and easily understood by a human. This is accomplished by sifting, sorting, and summarizing the raw data before it is presented for display, storage, or transmission. Thereby, individuals can now interpret the data and make key decisions based thereon.

Extracting raw data from one or more operational databases and transforming it into useful information (e.g., data "warehouses" and data "marts") is the function of analytic applications. In data warehouses and data marts, the data are structured to satisfy decision support roles rather than operational needs. A data warehouse utilizes a business model to combine and process operational data and make it available in a consistent way. Before the data are loaded into the data warehouse, the corresponding source data from an operational database are filtered to remove extraneous and erroneous records; cryptic and conflicting codes are resolved; raw data are translated into something more meaningful; and summary data that are useful for decision support, trend analysis and modeling or other end-user needs are pre-calculated. A data mart is similar to a data warehouse, except that it contains a subset of corporate data for a single aspect of business, such as finance, sales, inventory, or human resources.

In the end, the data warehouse or data mart is comprised of an "analytical" database containing extremely large amounts of data useful for direct decision support or for use in analytic applications capable of sophisticated statistical and logical analysis of the transformed operational raw data. With data warehouses and data marts, useful information is retained at the disposal of the decision-makers and users of analytic applications and may be distributed to data warehouse servers in a networked system. Additionally, decision-maker clients can retrieve analytical data resident on a remote data warehouse servers over a computer system network.

An example of the type of company that would use data warehousing is an online Internet bookseller having millions of customers located worldwide whose book preferences and purchases are tracked. By processing and warehousing these data, top executives of the bookseller can access the processed data from the data warehouse, which can be used for sophisticated analysis and to make key decisions on how to better serve the preferences of their customers throughout the world.

The rapid increase in the use of networking systems, including Wide Area Networks (WAN), the Worldwide Web and the Internet, provides the capability to transmit operational data into database applications and to share data contained in databases resident in disparate networked servers. For example, vast amounts of current transactional data are continuously generated by business-to-consumer and business-to-business electronic commerce conducted over the Internet. These transactional data are routinely captured and collected in an operational database for storage, processing, and distribution to databases in networked servers.

The expanding use of "messaging systems" and the like enhances the capacity of networks to transmit data and to provide interoperability between disparate database systems. Messaging systems are computer systems that allow logical elements of diverse applications to seamlessly link with one another. Messaging systems also provide for the delivery of data across a broad range of hardware and software platforms, and allow applications to interoperate across network links despite differences in underlying communications protocols, system architectures, operating systems, and database services. Messaging systems and the recent development of Internet access through wireless devices such as enabled cellular phones, two-way pagers, and hand-held personal computers, serve to augment the transmission and storage of data and the interoperability of disparate database systems.

In the current data warehouse/data mart networking environment, one general concern involves the sheer volume of data that must be dealt with. Often massive, multi-terabyte data files are stored in various server sites of data warehouses or in operational databases. Transmitting these massive amounts of data over WANs or the Internet is a troublesome task. The space needed to store the data is significant, and the transmission time is often lengthy.

Furthermore, accessing the resulting data is difficult on a wireless device due to the vast size of the data file. Portable and/or wireless services such as cellular phones, two-way pagers, and hand-held personal computers, have limited computational and display resources.

Accordingly, there is a need for a reliable, convenient and rapid method and/or system for the navigating through the large amounts of data, such as data in a data warehouse/mart. There is a further need to accomplish the navigation through the large amounts of data on a wireless device such as enabled cellular phones, two-way pagers, and hand-held personal computers.

SUMMARY OF INVENTION

The present invention provides a reliable, convenient and rapid method and/or system for the navigating through the large amounts of data, such as data in a data warehouse/mart. The present invention further provides a method and/or system for navigating through a large amount of data on a wireless device such as enabled cellular phones, two-way pagers, and hand-held personal computers.

Specifically, in one embodiment, the present invention accesses a source of formatted warehoused data. The present invention then displays a grid on a display device. In one embodiment, the grid is an iconic representation of the formatted warehoused data. The grid is comprised of elements, each element corresponding to some portion of the formatted warehoused data. In addition, a portion of the formatted warehoused data is displayed on the display device in response to a selection of a corresponding element of the grid.

In another embodiment, a source of formatted warehoused data is accessed. The formatted warehoused data is then distilled into a plurality of hierarchical overviews. In general, a hierarchical overview comprises a subtotal of selected entries from the formatted warehoused data. Specifically, in response to a first inquiry, a hierarchical overview is received.

BRIEF DESCRIPTION OF THE DRAWINGS

The accompanying drawings, which are incorporated in and form a part of this specification, illustrate embodiments of the invention and, together with the description, serve to explain the principles of the invention.

FIGS. 5A–5C illustrate an exemplary version of formatted warehoused data in accordance with embodiments of the present invention for navigating a large amount of data.

The drawings referred to in this description should be understood as not being drawn to scale except if specifically noted.

DETAILED DESCRIPTION

A method and system for the wireless delivery of data, including business metrics, transformed data, untransformed data, or raw data are described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "transmitting", "receiving", "determining", "creating", "storing", "delivering", "accessing", "generating", "distilling", "providing", "displaying", "outputting", "compressing", "decompressing" or the like, can refer to the actions and processes (e.g., processes 400 and 600 of FIGS. 4 and 6, respectively) of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Figure 1:
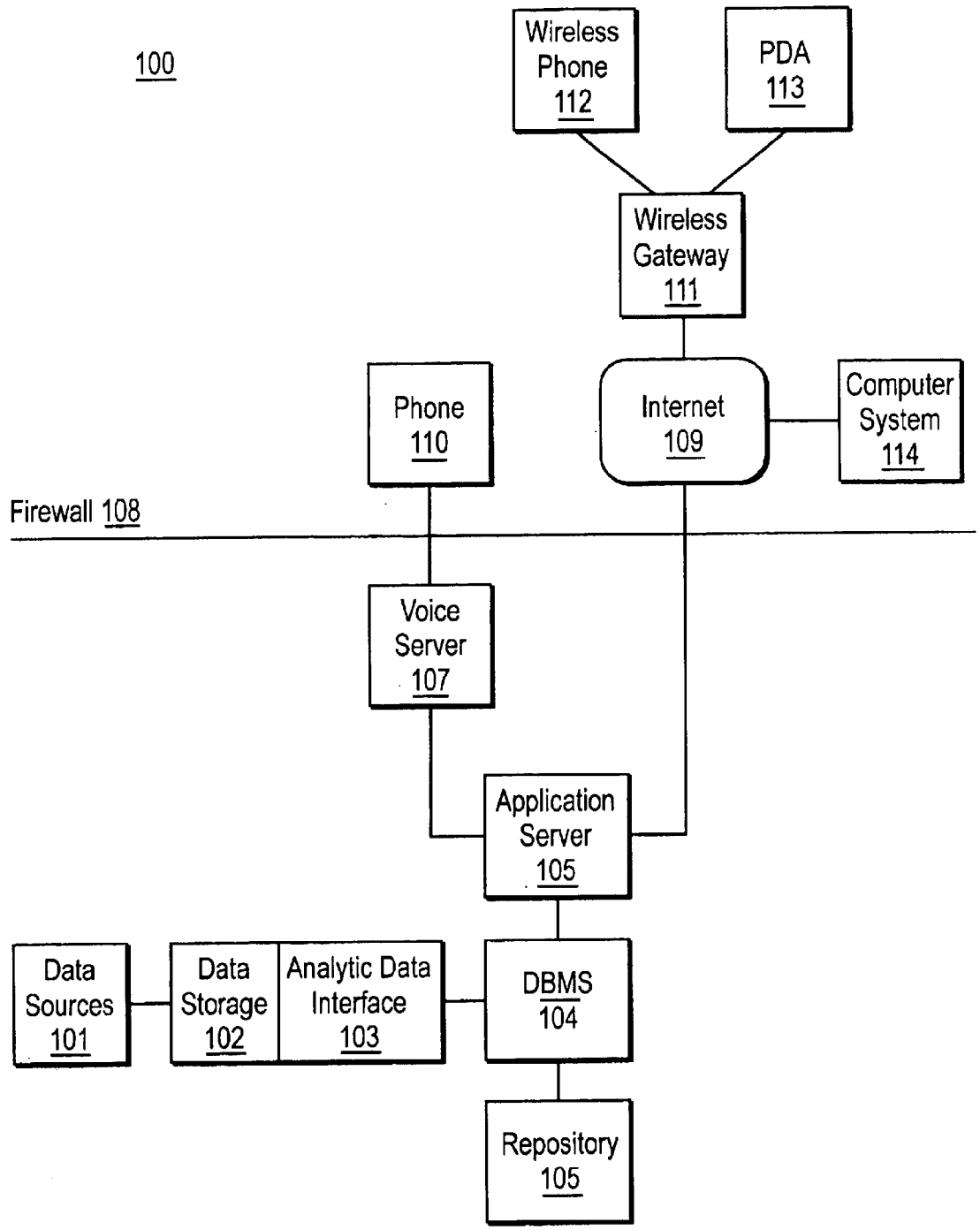
FIG. 1 illustrates a schematic block diagram of an exemplary client/server computer system network upon which embodiments of the present invention may be implemented.

FIG. 1 is a block diagram depicting one embodiment of a system 100 for the delivery of data, particularly the wireless delivery of data, in accordance with the present invention. Data sources 101 include one or more sources of data resulting from business and financial transactions, equipment performance logs, and the like.

These data sources can based on and formatted according to a Relational Database Management System (RDBMS) (such as from Oracle, Informix, Sybase, Microsoft, etc.), an Enterprise Resource Planning (ERP) system, Service Advertising Protocol (SAP), flat files, and other data transmission formats, either planned or envisioned, including XML, WML, HDML, HTML, and compact (lightweight) HTML.

Data storage 102 is for storing operational data and the like from data sources 101, typically using a high capacity mass storage device (such as hard disk drives, optical drives, tape drives, etc.). In one embodiment, data storage 102 is a data warehouse. Data storage 102 is coupled to a database management system (DBMS) 104 by analytic data interface 103. DBMS 104 executes an analytic application such as a data mart application. A repository 105 is coupled to (or integrated with) DBMS 104 for storing information from the database management system.

There are at least three styles of calculating data (e.g., business metrics): periodic, on demand, and continuous (real time). In the periodic style, data are calculated at predetermined intervals (e.g., hourly, daily, weekly, etc.) and stored in repository 105, and the most recent data are provided to the requester. In the on demand style, the data are calculated in response to a user request. These data may be cached or persisted in some manner (e.g., in repository 105), but do not exist or have value until they are initially requested. In the continuous (real time) style, data are updated as underlying data are updated. For example, a business metric describing the moving average for the inventory of a particular item gets updated as the inventory level for that item is updated. In each case, the requester gets the freshest data.

Returning to FIG. 1, in the present embodiment, an application server 106 is interposed between the DBMS 104 and a voice server 107 or the Internet 109. In one embodiment, application server 106 is accessible to users via a unique Uniform Resource Locator (URL). Application server 106 provides information (e.g., business metrics and transformed data, but also untransformed or raw data) to users from DBMS 104 and/or repository 105.

Voice server 107 provides voice-to-text and text-to-voice services for converting voice messages received from a user via a conventional telephone 110, and for similarly converting information from application server 106 into an audible message. A user can thereby access application server 106 using a conventional telephone 110 via voice server 107, and receive information from application server 106 via the same path. For security purposes, a firewall 108 encloses voice server 107, application server 106, and the other devices and components coupled with those devices on the internal side of the firewall.

Wireless gateway 111 enables communication between wireless devices and application server 106 within the framework of a wireless service provider (WSP). Wireless devices are exemplified as wireless phone 112 and PDA 113; however, it is appreciated that other types of wireless devices such as a pager or two-way pager, or any other data-capable or data-enabled device operable for wireless communication, may be used. Preferably, the wireless devices have display capability, but other means for conveying information to a user may be utilized. For example, information can be converted into an audible message (e.g., text-to-voice).

Coupled to the Internet 109 may be a computer system 114 that is also capable of communicating with application server 106. For example, information can be exchanged between computer system 114 and application server 106 via electronic mail (e-mail). Computer system 114 may also incorporate a Web browser or other such elements allowing it to access a Web site on application server 106 using the URL for application server 106.

In summary, system 100 supports a number of various different types of end-user devices, as well as different types of service providers (e.g., Internet Service Providers, WSPs, etc.). In accordance with the present invention, a user can register a variety of devices and device types utilizing different service providers, protocols (e.g., wireless application protocol (WAP)), Communication standards, and data formats, and use these devices to receive information (e.g., business metrics, etc.) at remote locations (e.g., at field locations worldwide).

Figure 2:
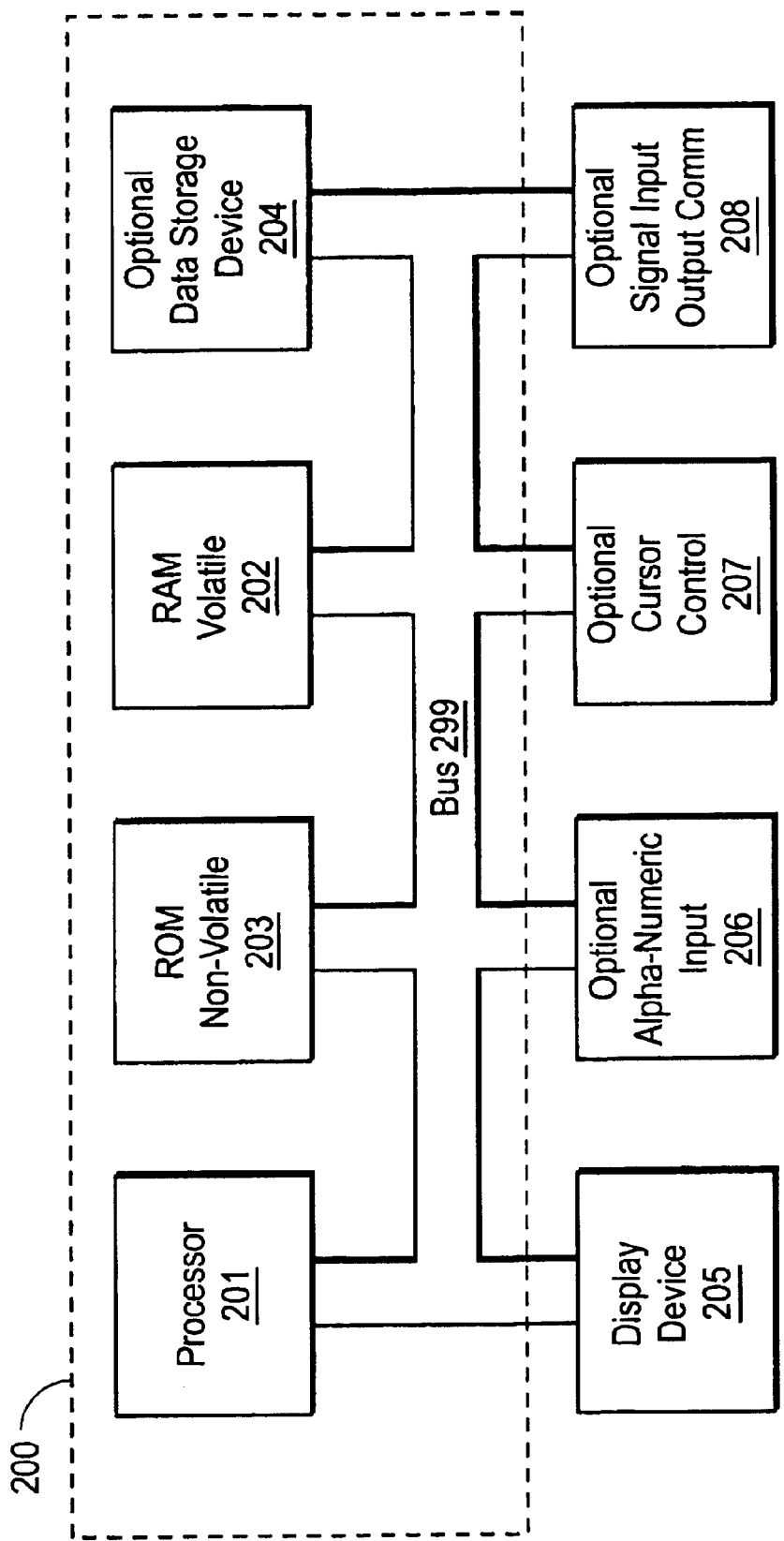
FIG. 2 illustrates an exemplary computer system upon which embodiments of the present invention may be practiced.

FIG. 2 is a block diagram of an embodiment of an exemplary device 200 used in accordance with the present invention. It should be appreciated that device 200 of the present embodiment is well suited to be any type of computing device (e.g., server computer, portable computing device, desktop computer, mobile phone, pager, personal digital assistant, etc.). Within the following discussions of the present invention, certain processes and steps are discussed that are realized, in one embodiment, as a series of instructions (e.g., software program) that reside within computer readable memory units of device 200 and executed by a processor(s) of device 200. When executed, the instructions cause device 200 to perform specific actions and exhibit specific behavior which is described in detail herein.

Device 200 of FIG. 2 comprises an address/data bus 299 for communicating information, one or more central processors 201 coupled with bus 299 for processing information and instructions. Central processor unit(s) 201 may be a microprocessor or any other type of processor. The device 200 also includes data storage features such as a computer usable volatile memory unit 202 (e.g., random access memory, static RAM, dynamic RAM, etc.) coupled with bus 299 for storing information and instructions for central processor(s) 201, a computer usable nonvolatile memory unit 203 (e.g., read only memory, programmable ROM, flash memory, EPROM, EEPROM, etc.) coupled with bus 299 for storing static information and instructions for processor(s) 201. Device 200 also includes one or more signal generating and receiving devices 208 coupled with bus 299 for enabling device 200 to interface with other electronic devices and computer systems. The communication interface(s) 208 of the present embodiment may include wired and/or wireless communication technology. For example, within the present embodiment, the communication interface 208 may be a serial communication port, a Universal Serial Bus (USB), an Ethernet adapter, a FireWire (IEEE 1394) interface, a parallel port, a small computer system interface (SCSI) bus interface, infrared (IR) communication port, Bluetooth wireless communication port, a broadband interface, or an interface to the Internet, among others.

Optionally, device 200 may include an alphanumeric input device 206 including alphanumeric and function keys coupled to the bus 299 for communicating information and command selections to the central processor(s) 201. In one embodiment, alphanumeric input device 206 is a touch screen device; in this implementation, alphanumeric input device 206 is capable of registering a position where a stylus element (not shown) makes contact. The device 200 can include an optional cursor control or cursor directing device 207 coupled to the bus 299 for communicating user input information and command selections to the central processor(s) 201. The cursor-directing device 207 may be implemented using a number of well known devices such as a mouse, a track-ball, a track-pad, an optical tracking device, among others. In one embodiment, cursor control 207 is a touch screen device incorporated with display device 205. In this implementation, cursor control 207 is capable of registering a position on display device 205 where a stylus element makes contact. Alternatively, it is appreciated that a cursor may be directed and/or activated via input from the alphanumeric input device 206 using special keys and key sequence commands. The present embodiment is also well suited to directing a cursor by other means such as, for example, voice commands.

A display device 205 is coupled to bus 299 of device 200 for displaying video and/or graphics. It should be appreciated that display device 205 may be a cathode ray tube (CRT), flat panel liquid crystal display (LCD), field emission display (FED), plasma display or any other display device suitable for displaying video and/or graphic images and alphanumeric characters recognizable to a user. The device 200 of FIG. 2 may also include one or more optional computer usable data storage devices 204 such as a magnetic or optical disk and disk drive (e.g., hard drive or floppy diskette) coupled with bus 299 for storing information and instructions.

Figure 3:
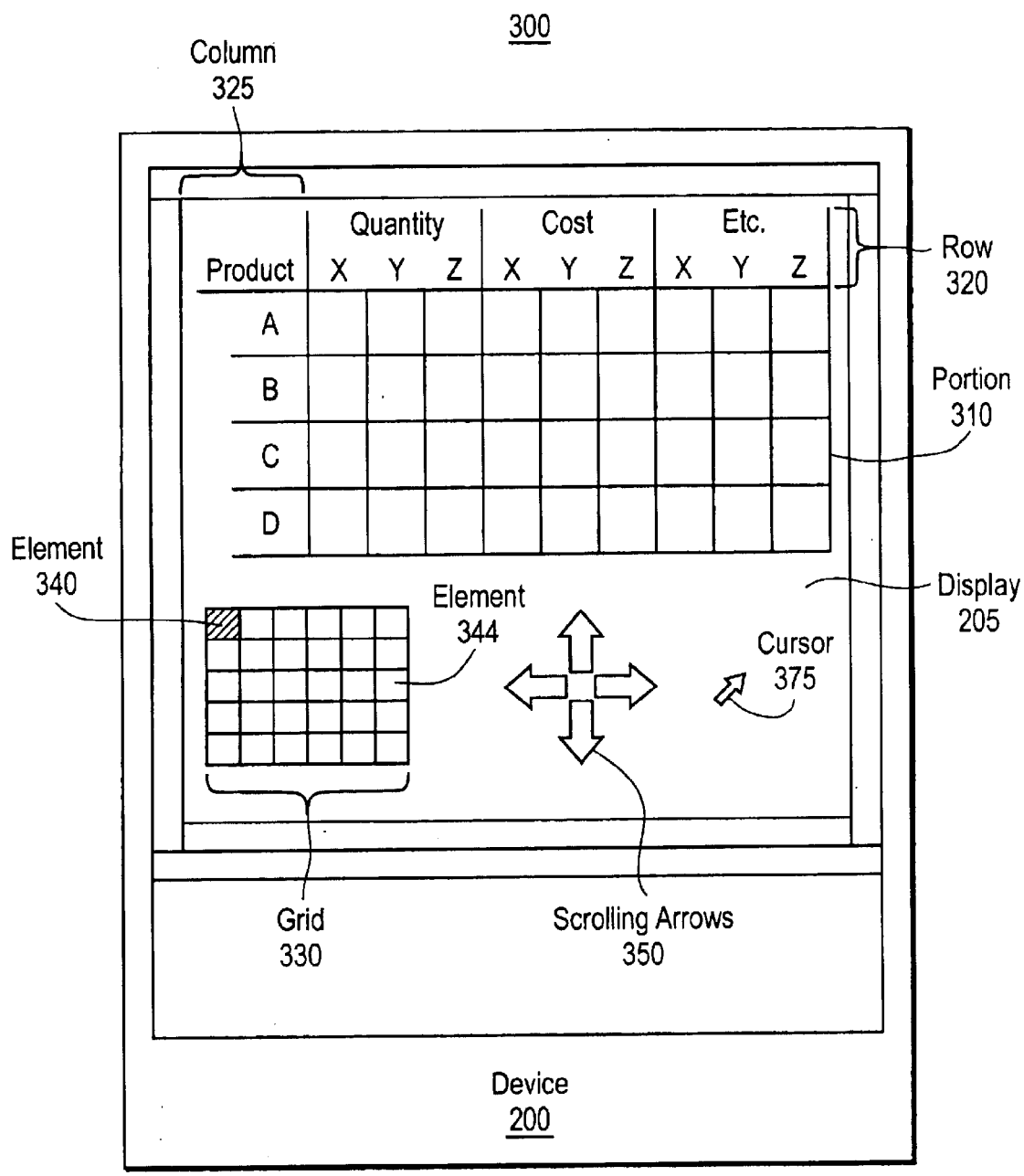
FIG. 3 illustrates an exemplary display device in accordance with an embodiment of the present invention for navigating a large amount of data.

FIG. 3 illustrates an exemplary display device 205 in accordance with an embodiment of the present invention for navigating a large amount of data. Specifically, FIG. 3, in combination with process 400 of FIG. 4, enables a user of a device 200 to access a large amount of formatted warehoused data, such as formatted warehoused data 500 of FIG. 5A. Additionally, FIG. 3 in combination with process 400 enables the user of device 200 to easily navigate the formatted warehoused data 500. For example, when device 200 accesses a source of formatted data (e.g., analytic data interface 103 of FIG. 1), FIG. 3 portrays the formatted data in an easily navigable environment. In one embodiment, the easily navigable environment of display 205 includes a grid 330, grid elements 340, and a displayed portion of warehoused data 500.

In one embodiment, the source of formatted warehoused data (e.g., 500) is stored on a content server (e.g., application server 106). Furthermore, application server 106 may be a web server, WAP gateway, or the like. In addition, the present embodiment prevents a server timeout between application server 106 and device 200. Specifically, the timeout is prevented by utilizing a separate thread for query execution that also allows for query cancellation. In so doing, the "pipeline" between device 200 and application server 106 remains open until the user chooses to close it. Thus, during the accessing of formatted warehoused data 500, device 200 will not be disconnected from application server 106 if an amount of idle time has passed. Therefore, the user of device 200 is does not have to re-access the formatted warehoused data 500 and re-enter a password.

More specifically, the formatted warehoused data 500 may be formatted in a cross-tabular manner (as a "report"). In addition, formatted warehouse data 500 is presented in a scaled iconic representation on display 205. In one embodiment, grid 330 is the scaled iconic representation of the formatted warehoused data 500 shown on a portion of display 205. Specifically, grid 330 is comprised of many elements, such as 340 and 344, which correspond to some portion of formatted warehoused data 500. An element in grid 330 may correspond to an entry in formatted warehoused data 500, or an element may correspond to multiple entries.

In addition, by selecting different elements (e.g., 340, 344, etc.) located within grid 330, a user can easily navigate the entire formatted warehoused data 500. As mentioned, each element 340 represents some portion of the total formatted warehoused data 500. Therefore, if a user desires to view a specific portion of the formatted warehoused data 500, the user need only select an element, such as element 340, from grid 330. In one embodiment, the user selects an element by contacting display device 205 with a stylus element, as described above. Upon selection of an element, such as element 340, a corresponding portion 310 of the formatted warehoused data 500 is downloaded to, and displayed on, display device 205. Hence, a user can easily read portion 310 on display device 205 without being overwhelmed with the entire formatted warehoused data 500 file.

Furthermore, by utilizing the iconic representation (e.g., grid 330), a user can intuitively deduce the size of the formatted warehoused data 500 being navigated. In one embodiment, display device 205 further utilizes analytic data interface 103 in conjunction with repository 105 to download only portion 310 to display device 205. Therefore, device 200 is not overloaded with the entire version of formatted warehoused data 500, but instead receives only the portion 310 selected for viewing.

Furthermore, in one embodiment, the corresponding portion 310 of grid 330 may retain the axis labels of the formatted warehoused data 500 while the user navigates through grid 330. For example, in the initial representation of portion 310 both a row 320 label and a column 325 label are included. The content of row 320 and column 325 will pertain to the content of element 340. If element 344 is then selected as the next portion 310 to be represented, the column 325 and row 320 will remain a visual part of portion 310; however, the content of row 320 and column 325 will now pertain to the content of element 344. Even if the user selects an element (e.g., 344) of grid 330 that does not intrinsically include column 325 and row 320 headings, column 325 and row 320 headings will remain in the displayed portion 310.

In one embodiment, elements of grid 330 can be navigated upon display device 205 with the use of alpha-numeric input 206 (e.g. hot keys, keyboard arrows, etc.) and/or a graphical user interface (GUI) displayed on device 200. Examples of a GUI may include, but not limited to, a cursor 375, or scrolling arrows 350. The actual navigation of grid 330 can therefore be accomplished by scrolling through the elements (e.g., 340, 344) utilizing scrolling arrows 350, cursor 375, stylus element, or any specified keys. In addition, a specific element, such as element 340 or element 344, of grid 330 may be selected by utilizing hot keys, cursor 375, stylus element, etc., to choose the desired element (e.g., 340, 344) for viewing.

With reference still to FIG. 3, examples of device 200 may include, but are not limited to, a mobile phone, and a portable-computing device (e.g. personal digital assistant, pager, and the like). It is also appreciated, that in one embodiment, the element (e.g., 340) of grid 330 which is displayed as portion 310 may be visually modified (e.g., highlighted, darkened, lightened, shaded, etc.) to signify the element (e.g., 340) of grid 330 presently being viewed.

In the present embodiment, the dimensions of grid 330, element 340, and displayed portion 310 are all adjusted by analytic data interface 103 according to specific metrics supplied to analytic data interface 103 by device 200. For example, if device 200 has a display 205 of x-by-y dimensions, then analytic data interface 103 formats the warehoused data 500 such that a presentation of size x-by-y dimensions will appear on display device 205. Therefore, the present method for navigating a large amount of data can account for the characteristics of the display 205 utilized by device 200, and thus can be used with a variety of such devices.

Figure 4:
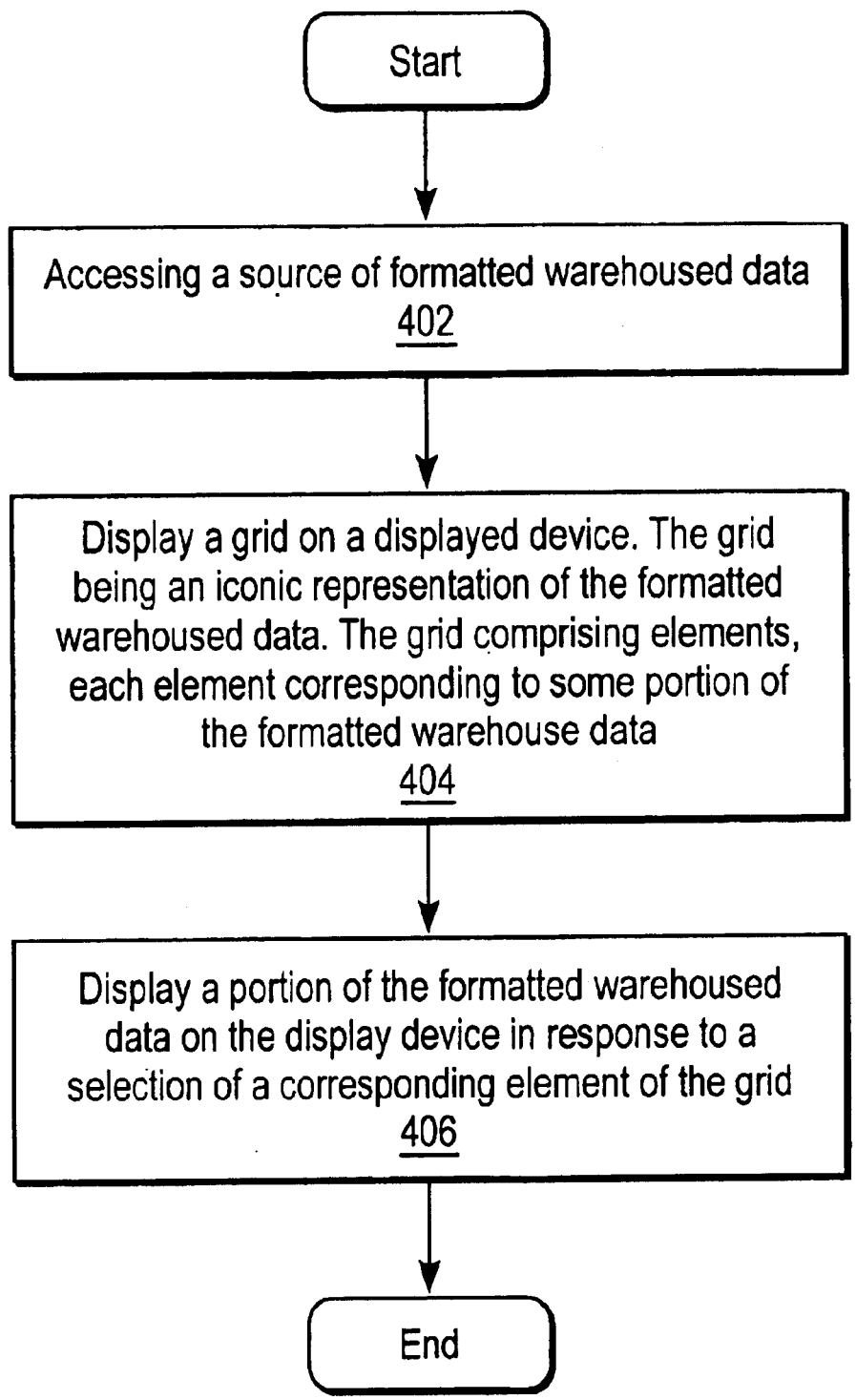
FIG. 4 is a flowchart of steps performed in accordance with an embodiment of the present invention for navigating a large amount of data.

FIG. 4 is a flowchart 400 of the steps performed in accordance with an embodiment of the present invention for navigating a large amount of data. Flowchart 400 includes processes of the present invention which, in one embodiment, are carried out by processors and electrical components under the control of computer readable and computer executable instructions. The computer readable and computer executable instructions may reside, for example, in data storage features such as data storage device 202, 203, and/or 204 of FIG. 2. However, the computer readable and computer executable instructions may reside in any type of computer readable medium. Although specific steps are disclosed in flowchart 400, such steps are exemplary. That is, the present embodiment is well suited to performing various other steps or variations of the steps recited in FIG. 4. Within the present embodiment, it should be appreciated that the steps of flowchart 400 may be performed by software, by hardware, or by any combination of software and hardware.

With reference now to step 402 of FIG. 4, the present embodiment causes device 200 to access a source of formatted warehouse data (e.g., 500 of FIG. 5A). It is understood that step 402 may be implemented in a wide variety of ways in accordance with an embodiment of the present invention. For example, the present embodiment may cause device 200 to access formatted warehouse data 500 in any manner similar to that described herein.

In step 404 of FIG. 4, the present embodiment causes device 200 to display a grid 330 on display device 205 (FIG.

3). In general, grid 330 is an iconic representation of the formatted warehoused data 500. It is further appreciated that grid 330 is comprised of elements, such as element 340. In addition, each element (e.g., 340) corresponds to a portion of the formatted warehouse data 500. It is understood that step 404 may be implemented in a wide variety of ways in accordance with an embodiment of the present invention. For example, at step 404, the present embodiment may cause device 200 to display a grid 330 in any manner similar to that described herein.

At step 406 of FIG. 4, the present embodiment causes the device (e.g. 200) to display a portion of the formatted warehoused data 500 on the display (e.g., 205) in response to a selection of a corresponding element (e.g. 340) of grid 330. Step 406 may be performed in diverse ways in accordance with an embodiment of the present invention. For example, the present embodiment may cause device 200 to display a portion of the formatted warehoused data 500 on display 205 in response to a selection of a corresponding element of grid 330 in any manner similar to that described herein.

FIGS. 5A–5C illustrate exemplary versions of formatted warehoused data in accordance with an embodiment of the present invention for navigating a large amount of data. Specifically, formatted warehoused data 500 is a cross-tabular illustration of one embodiment for representing the formatted warehoused data stored in repository 105. Although a specific cross-tabular version of formatted warehoused data 500 is shown, many organizational formats of warehoused data 500 may be used. The cross-tabular format is shown merely for purposes of brevity and clarity.

With reference still to FIGS. 5B–5C, the present embodiment illustrates further hierarchical overview versions of FIG. 5A. Specifically, FIGS. 5B–5C are subtotal versions of the initial formatted warehoused data 500. In one embodiment, subtotaling data is a method for dynamically rolling formatted warehoused data 500 up to a higher level to make it more digestible. Specifically, subtotaling refers to trying to distill as much information as possible from a larger more detailed table of data. That is, table 520 is a subtotal of table 500, table 540 is a subtotal of table 520. Therefore, table 540 shows the least amount of detail while table 500 shows the most detail. It is appreciated that tables 500, 520, and 540 are exemplary and are shown in the present embodiment merely for purposes of clarity.

Figure 6:
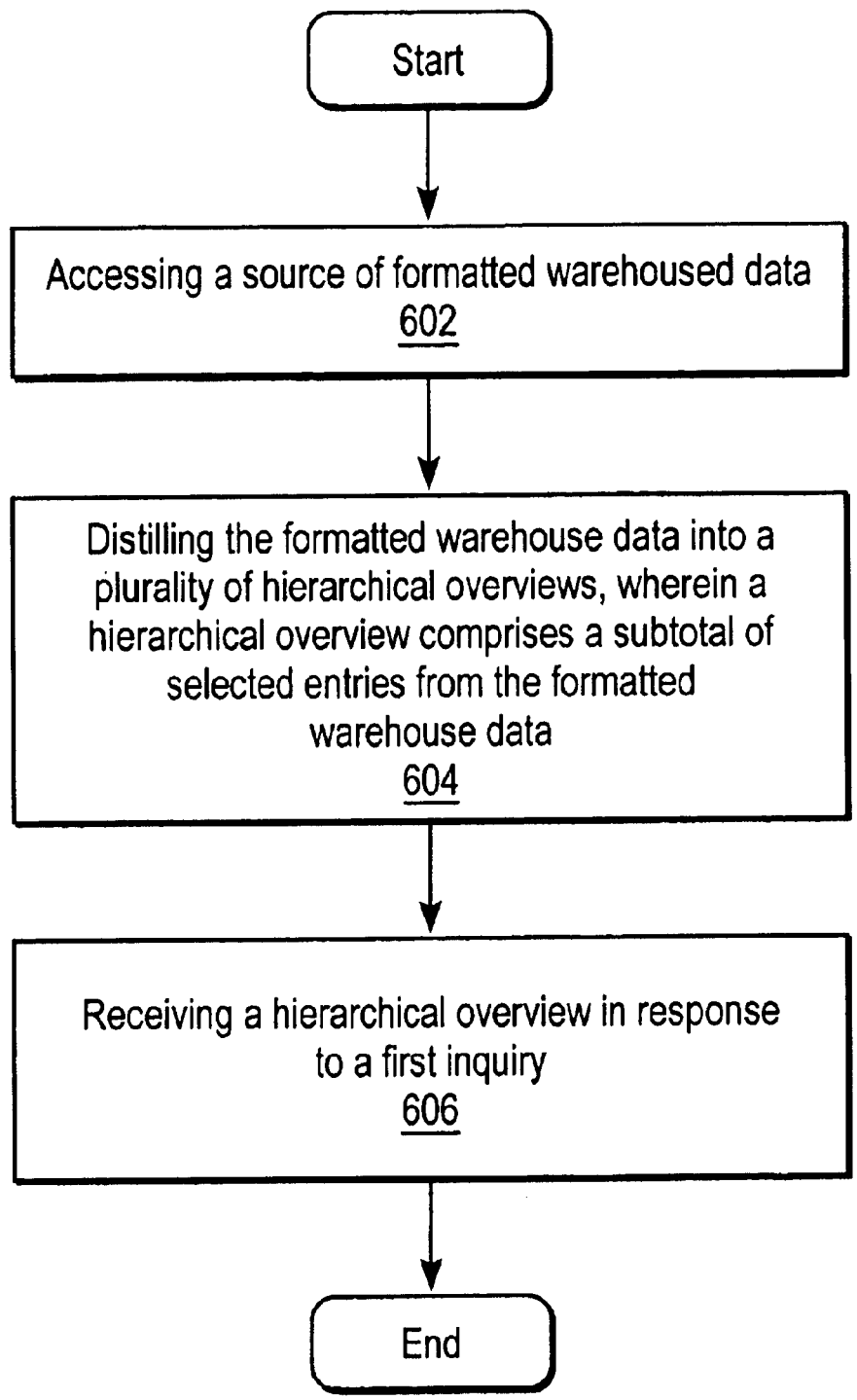
FIG. 6 is a flowchart of steps performed in accordance with another embodiment of the present invention for navigating a large amount of data.

FIG. 6 is a flowchart of the steps performed in accordance with an embodiment of the present invention for navigating a large amount of data. Flowchart 600 includes processes of the present invention which, in one embodiment, are carried out by processors and electrical components under the control of computer readable and computer executable instructions. The computer readable and computer executable instructions may reside, for example, in data storage features such as data storage device 202, 203, and/or 204 of FIG. 2. However, the computer readable and computer executable instructions may reside in any type of computer readable medium. Although specific steps are disclosed in flowchart 600, such steps are exemplary. That is, the present embodiment is well suited to performing various other steps or variations of the steps recited in FIG. 6. Within the present embodiment, it should be appreciated that the steps of flowchart 600 may be performed by software, by hardware, or by any combination of software and hardware.

In one embodiment, process 600 is an exemplary process for navigating a large amount of formatted warehoused data 500 utilizing voice commands. In general, device 200 may be any device which can transmit and/or receive voice data, such as, but not limited to, a regular phone 110, wireless phone 112, PDA 113, and/or computer system 114. Further, in one embodiment, the formatted warehoused data 500 of process 600 is the same formatted warehoused data 500 of process 400. However, due to the voice navigation abilities of process 600, the format in which analytic data interface 103 represents the formatted warehoused data 500 to process 600 may be different.

For example, in one embodiment, process 600 uses a voice recognition interface, such as voice server 107, to convey easily digestible portions of formatted warehoused data 500. In one embodiment, voice server 107 conveys inquiries and responses to inquiries audibly according to a voice-based communications protocol.

In order to distill the formatted warehoused data 500 into pieces that can be readily conveyed by voice, analytic data interface 103 formats the warehoused data 500 into a plurality of hierarchical overviews (e.g., FIGS. 5A–5C). Specifically, formatted warehoused data 500 is reduced in scope by subtotaling the contents thereof. Then, at each subtotal (e.g. overview), a user has the option of drilling deeper into a specific result in order to review the underlying data. For example, if process 600 were to deliver an initial hierarchical overview (e.g., table 540 of FIG. 5C) to device 200, the initial information received in response to an inquiry may be a quantity statement then a cost statement. The user may then wish to hear more information or hear the information from a different perspective by selecting a new level of clarity. For example, in a report with Year and Product attributes, the user could first hear sub-totaled metric values for a given year for all products. Then after selecting a specific product, they could hear the metric values for the given year for the selected product. In order to obtain this information, the user formulates an inquiry. In one embodiment, the user accomplishes this with a voice command.

Process 600 may respond with the quantities NA, NB, NC of each product A, B, C. The user can drill down to the next level (e.g., table 510 of FIG. 5A) by initiating an inquiry for more information about one of the products in particular (e.g., product A), receiving in response a breakdown of the components of the quantity NA. Such "drilling down" can be continued in infinitum.

In general, a report exemplified by table 500 of FIG. 5A is generated and resides in applications server 106 of FIG. 1. When a user at a wireless device accesses this information, instead of hearing an item-by-item recitation of all the entries in table 500. A hierarchical overview such as that of table 540 is heard. The user can then select one of the items in the hierarchical overview, and receive more details about that item. This process can be repeated until the user reaches the desired level of detail. Thus, according to the present invention, a user can receive detailed information using a voice based communications system, but without having to hear an item-by-item recitation of a multitude of entries. The present invention thus provides a ready mechanism for navigating through a large table of data using voice commands.

With reference still to process 600, any hierarchical overview is possible with respect to the present embodiment, the examples with regard to FIGS. 5A–5C are shown merely as one example of a multitude of possible overview breakdown criteria. It is further appreciated that the present process 600 can be performed on a screen and may not require voice cues at all. In fact, the hierarchical overview utilized in process 600 may respond to voice inquiries, hot key inquiries, a single click of a cursor, or any other possible input features which are known to one skilled in the art.

Another embodiment for navigating a large amount of formatted warehoused data 500 on a display device 200 (of FIG. 2) is described herein. Specifically, the formatted warehoused data of table 500 may be represented in a row-by-row format instead of the subtotal format as described above. For example, each row of data from table 500 may be represented in a row-by-row fashion on display 205. This type of format may be useful when a table of data (e.g., 500) contains many rows but few columns. Thus instead of viewing a small table (e.g., table 540) with a limited amount of subtotaled data, the user may choose to view the formatted warehoused data 500 by row. Such a row-by-row format will allow a user to gain a useful view of a table while not being overwhelmed with the entire table (e.g. 500).

In addition, the row-by-row method for displaying formatted warehoused data 500, on device 200 may further "freeze" a row for comparison purposes. That is, in the same way as the row 320 and column 325 (of FIG. 3) headings were maintained on display 205, a specific row of data may be held on display 205. Therefore, a user may compare one specific row with many different rows throughout the table. For example, if one row is of particular interest, the user may navigate throughout the other rows of a table (e.g., table 500) while maintaining the desired row as a fixed part on display 205.

With reference now to step 602 of FIG. 6, the present embodiment causes device 200 to access a source of formatted warehouse data. It is understood that step 602 may be implemented in a wide variety of ways in accordance with an embodiment of the present invention. For example, the present embodiment may cause device 200 to access formatted warehouse data in any manner similar to that described herein. It is further appreciated that device 200 may be any device which can transmit and receive voice data, such as, but not limited to, a regular phone 110, wireless phone 112, PDA 113, computer system 114.

At step 604 of FIG. 6, the present embodiment causes formatted warehoused data 500 to be distilled into a plurality of hierarchical overviews (e.g. 500, 520, and 540 of FIGS. 5A–5C). Further, the hierarchical overviews (e.g. 500, 520, and 540) comprise a subtotal of selected entries from the formatted warehoused data 500. Step 604 may be performed in a variety of ways in accordance with embodiment of the present invention. For example, the present embodiment may cause formatted warehoused data 500 to be distilled into a plurality of hierarchical overviews (e.g. 500, 520, and 540) in any manner similar to that described herein.

At step 606 of FIG. 6, the present embodiment causes device (e.g., 200) to receive a hierarchical overview (e.g. 540) in response to a first inquiry. Step 606 may be performed in a variety of ways in accordance with embodiment of the present invention. For example, the present embodiment may cause device 200 to receive a hierarchical overview 540 in any manner similar to that described herein.

Thus, the present invention provides a reliable, convenient and rapid method and/or system for the navigating through the large amounts of data, such as data in a data warehouse/mart. The present invention further provides a method and/or system for navigating through a large amount of data on a wireless device such as enabled cellular phones, two-way pagers, and hand-held personal computers.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. A method for navigating a large amount of data, said method comprising:

accessing a source of formatted warehoused data;

displaying a grid on a display device, said grid being an iconic representation of said formatted warehoused data, said grid comprising elements, each element corresponding to some portion of said formatted warehoused data; and displaying a portion of said formatted warehoused data on said display device in response to a selection of a corresponding element of said grid.

2. The method as recited in claim 1, wherein content server timeouts are prevented while accessing said source of formatted data.

3. The method as recited in claim 1, wherein said warehoused data is formatted in a cross-tabular manner.

4. The method as recited in claim 1, wherein said portion of said formatted warehoused data is indicated by a distinctive marking of said corresponding element of said grid.

5. The method as recited in claim 1, wherein only said portion of said formatted warehoused data is downloaded to said display device in response to said selection.

6. The method as recited in claim 1, wherein a different portion of said formatted warehoused data is displayed on said display device by selecting a different element of said grid.

7. The method as recited in claim 1, wherein a graphical user interface (GUI) comprising a cursor and scrolling arrows is also displayed on said display device.

8. The method as recited in claim 7, wherein a different portion of said formatted warehoused data is displayed by utilizing said GUI to navigate within said grid and to select a different element of said grid.

9. A device comprising:

a bus;

a display coupled with said bus;

a memory unit coupled with said bus; and a processor coupled with said bus, said processor for executing a method for navigating a large amount of data, said method comprising:

accessing a source of formatted warehoused data;

displaying a grid on said display, said grid being an iconic representation of said formatted warehoused data, said grid comprising elements, each element corresponding to some portion of said formatted warehoused data; and displaying a portion of said formatted warehoused data on said display in response to a selection of a corresponding element of said grid.

10. The device of claim 9, wherein content server timeouts are prevented while accessing said source of formatted data.

11. The device of claim 9, wherein said warehoused data is formatted in a cross-tabular manner.

12. The device of claim 9, wherein said portion of said formatted warehoused data is indicated by a distinctive marking of said corresponding element of said grid.

13. The device of claim 9, wherein only said portion of said formatted warehoused data is downloaded in response to said selection.

14. The device of claim 9, wherein a different portion of said formatted warehoused data is displayed on said display by selecting a different element of said grid.

15. The device of claim 9, wherein a graphical user interface (GUI) comprising a cursor and scrolling arrows is also displayed on said display.

16. The device of claim 15, wherein a different portion of said formatted warehoused data is displayed by utilizing said GUI to navigate within said grid and to select a different element of said grid.

17. A method for navigating a large amount of data, said method comprising:

accessing a source of formatted warehoused data;

distilling said formatted warehoused data into a plurality of hierarchical overviews, wherein a hierarchical overview comprises a subtotal of selected entries from said formatted warehoused data; and receiving a hierarchical overview in response to a first inquiry.

18. The method as recited in claim 17, wherein content server timeouts are prevented while accessing said source of formatted data.

19. The method as recited in claim 17, wherein warehoused data is formatted in a cross-tabular manner.

20. The method as recited in claim 17, wherein said device is a communications device.

21. The method as recited in claim 17, wherein information about said selected entries is received in response to a subsequent inquiry.

22. The method as recited in claim 17, wherein inquiries and responses to inquiries are conveyed audibly according to a voice-based communications protocol.

23. The method as recited in claim 21, wherein a response to an inquiry is displayed.

24. A device comprising:

a bus;

a memory unit coupled with said bus; and a processor coupled with said bus, said processor for executing a method for navigating a large amount of data, said method comprising:

accessing a source of formatted warehoused data;

distilling said formatted warehoused data into a plurality of hierarchical overviews, wherein a hierarchical overview comprises a subtotal of selected entries from said formatted warehoused data; and receiving a hierarchical overview in response to a first inquiry.

25. The device of claim 24, wherein content server timeouts are prevented while accessing said source of formatted data.

26. The device of claim 24, wherein warehoused data is formatted in a cross-tabular manner.

27. The device of claim 24, wherein said device is a communications device.

28. The device of claim 24, wherein information about said selected entries is received in response to a subsequent inquiry.

29. The device of claim 24, wherein inquiries and responses to inquiries are conveyed audibly according to a voice-based communications protocol.

30. The device of claim 28, wherein a response to an inquiry is displayed.

* * * * *